(12) United States Patent
Kasai et al.

(10) Patent No.: US 9,643,493 B2
(45) Date of Patent: May 9, 2017

(54) DISPLAY CONTROL APPARATUS

(71) Applicant: FUJITSU TEN LIMITED, Kobe-shi, Hyogo (JP)

(72) Inventors: Kazuyoshi Kasai, Kobe (JP); Kyohei Morita, Kobe (JP); Yusuke Iguchi, Kobe (JP); Naoya Sugimoto, Kobe (JP); Yusuke Matsui, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 157 days.

(21) Appl. No.: 14/309,075

(22) Filed: Jun. 19, 2014

(65) Prior Publication Data
US 2015/0002286 A1 Jan. 1, 2015

(30) Foreign Application Priority Data

Jun. 26, 2013 (JP) ................................. 2013-133338

(51) Int. Cl.
*B60Q 1/00* (2006.01)
*B60K 35/00* (2006.01)
*B60K 28/06* (2006.01)

(52) U.S. Cl.
CPC ............ *B60K 35/00* (2013.01); *B60K 28/066* (2013.01); *B60K 2350/901* (2013.01)

(58) Field of Classification Search
CPC combination set(s) only.
See application file for complete search history.

(56) References Cited

U.S. PATENT DOCUMENTS

| 5,457,439 A * | 10/1995 | Kuhn | B60K 35/00 340/435 |
| 7,561,054 B2 * | 7/2009 | Raz | B60R 16/0231 340/438 |
| 8,004,424 B2 * | 8/2011 | Matsuoka | B60Q 9/008 340/435 |
| 8,108,083 B2 * | 1/2012 | Kameyama | G01C 21/3641 180/272 |

(Continued)

FOREIGN PATENT DOCUMENTS

| JP | A-2003-317197 | 11/2003 |
| JP | 2007261432 A | 10/2007 |

(Continued)

OTHER PUBLICATIONS

Feb. 28, 2017 Office Action issued in Japanese Patent Application No. 2013-133338.

*Primary Examiner* — Joseph Feild
*Assistant Examiner* — Rufus Point
(74) *Attorney, Agent, or Firm* — Oliff PLC

(57) ABSTRACT

In a vehicle-mounted display system, a spare attentiveness level deriving part derives a spare attentiveness level that is a parameter determined according to a state of a driver of a vehicle at a present moment and a risk level deriving part derives a risk level that is a parameter determined according to a risk level of an accident at the present moment. Then a display continuously displays a driving state mark that is a reference graphic, determined according to the spare attentiveness level and the risk level, while the driver is driving the vehicle. Therefore, the driver can continuously understand the own state and the risk level of an accident at the present moment.

17 Claims, 12 Drawing Sheets

(56) References Cited

U.S. PATENT DOCUMENTS

| | | | | |
|---|---|---|---|---|
| 8,160,772 | B2* | 4/2012 | Ito | G08G 1/096725 180/271 |
| 8,903,593 | B1* | 12/2014 | Addepalli | H04W 4/046 701/29.1 |
| 9,135,803 | B1* | 9/2015 | Fields | B60K 28/066 |
| 9,440,657 | B1* | 9/2016 | Fields | B60K 28/066 |
| 2003/0060937 | A1* | 3/2003 | Shinada | G01C 21/3641 701/1 |
| 2004/0207260 | A1* | 10/2004 | Hattori | G05B 19/042 307/9.1 |
| 2005/0159853 | A1* | 7/2005 | Takahashi | B60W 40/08 701/1 |
| 2007/0173994 | A1* | 7/2007 | Kubo | G07C 5/0858 701/32.4 |
| 2009/0234550 | A1* | 9/2009 | Takeuchi | B60K 28/06 701/70 |
| 2010/0332131 | A1* | 12/2010 | Horvitz | G01C 21/3697 701/414 |
| 2011/0077028 | A1* | 3/2011 | Wilkes, III | B60W 50/14 455/456.3 |
| 2011/0213628 | A1* | 9/2011 | Peak | G06Q 40/08 705/4 |
| 2013/0070043 | A1* | 3/2013 | Geva | B60K 28/066 348/14.02 |
| 2013/0201036 | A1* | 8/2013 | Stahlin | G08G 1/161 340/944 |
| 2013/0226441 | A1* | 8/2013 | Horita | B60Q 9/00 701/118 |
| 2014/0218187 | A1* | 8/2014 | Chun | G08B 21/06 340/439 |
| 2016/0039424 | A1* | 2/2016 | Hong | B60W 40/08 701/2 |
| 2016/0324478 | A1* | 11/2016 | Goldstein | A61B 5/721 |

FOREIGN PATENT DOCUMENTS

| | | |
|---|---|---|
| JP | 2010257234 A | 11/2010 |
| JP | A-2012-083981 | 4/2012 |
| JP | 2012128654 A | 7/2012 |

* cited by examiner

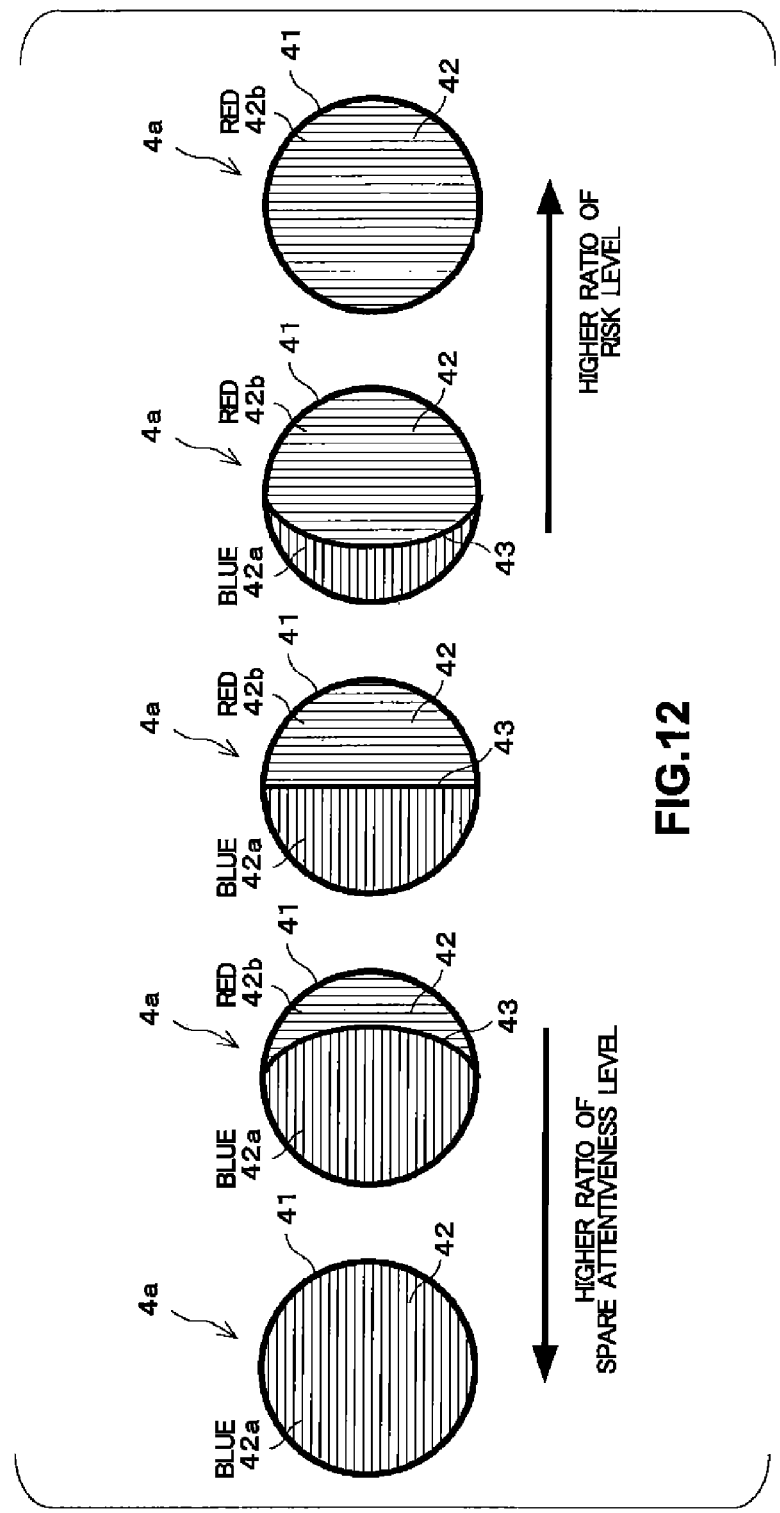

DISPLAY CONTROL APPARATUS

BACKGROUND OF THE INVENTION

Field of the Invention

The invention relates to a technology that provides information to a driver of a vehicle while the driver is driving the vehicle.

Description of the Background Art

Conventionally, a technology that provides information relating to a driving state to a driver who is driving a vehicle and the like has been proposed. One of known warning technologies derives a risk level of an accident based on an inter-vehicular distance obtained by, for example, a radar system or another device and notifies a driver of warning information when the risk level exceeds a threshold.

The conventional technology notifies the driver of the warning information only when the risk level exceeds the threshold, in other words, only when a risk, such as an accident, is imminent. Therefore, during absent of the warning information, the driver cannot correctly understand a driving state at a present moment. Therefore, during the absent of the waning information, the driver may drive with a lack of a sense of tension because the driver may determine that the driving state at the present moment is safe.

SUMMARY OF THE INVENTION

According to one aspect of the invention, a display control apparatus controls a display apparatus for providing information to a driver of a vehicle while the driver is driving the vehicle. The display control apparatus includes a controller that: (i) derives a first parameter according to a state of the driver at a present moment; (ii) derives a second parameter according to a risk level of an accident at the present moment; and (iii) causes a reference graphic, determined according to the first parameter and the second parameter, to be continuously displayed on the display apparatus while the driver is driving the vehicle.

Since the reference graphic, determined according to the first parameter and the second parameter, is continuously displayed on the display apparatus while the driver is driving the vehicle, the driver can continuously understand the own state and the risk level of an accident at the present moment.

Moreover, according to another aspect of the invention, the reference graphic represents a relative relationship between the first parameter and the second parameter.

Since the reference graphic representing the relative relationship between the first parameter and the second parameter is displayed on the display apparatus, the driver can intuitively understand the relationship between the own state and the risk level of an accident at the present moment.

Further, according to another aspect of the invention, the controller derives the first parameter based on a difference between (a) a load acceptable capacity that represents a load acceptable by the driver at the present moment and (b) a present load exerted on the driver at the present moment.

The driver can understand a load that the driver can accept in addition to a load exerted on the driver at the present moment.

Therefore, an object of the invention is to make it possible for the driver to continuously understand the driving state at the present moment.

These and other objects, features, aspects and advantages of the invention will become more apparent from the following detailed description of the invention when taken in conjunction with the accompanying drawings.

BRIEF DESCRIPTION OF THE DRAWINGS

FIG. 12 shows other examples of the driving state mark.

DESCRIPTION OF THE EMBODIMENTS

An embodiment of the invention is hereinafter described with reference to the drawings.

<1. System Outline>

Figure 1:
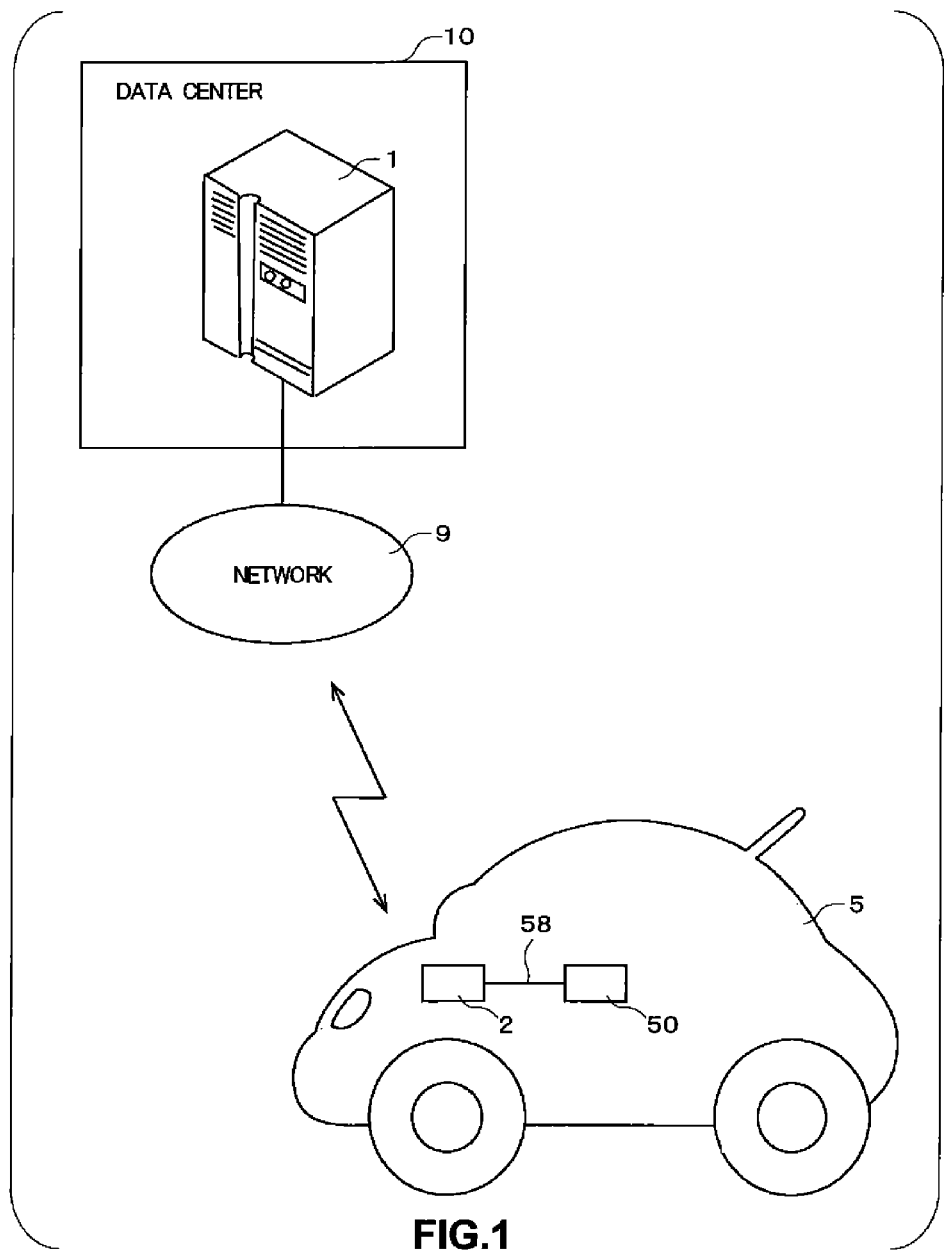
FIG. 1 shows an outline of a vehicle-mounted display system.

FIG. 1 shows an outline of a vehicle-mounted display system 2 in this embodiment. The vehicle-mounted display system 2 is mounted on a vehicle 5 and provides information relating to a driving state to a driver (user) while driving the vehicle 5.

The vehicle-mounted display system 2 is configured to send and receive signals to/from another electronic device 50 disposed on the vehicle 5, via an in-vehicle network 58. In addition, the vehicle-mounted display system 2 is configured to also send and receive signals to/from a server 1 via a wide area network 9, such as the Internet. The server 1 is disposed at, for example, a data center 10 that a facility for accumulation of information.

The vehicle-mounted display system 2 obtains a variety of information from the electronic device 50 on the vehicle 5, the server 1, etc. The vehicle-mounted display system 2 derives a parameter according to the driving state at a present moment, based on the variety of obtained information. Concretely, the vehicle-mounted display system 2 derives a "spare attentiveness level" that is a parameter determined according to a state of the driver and a "risk level" that is a parameter determined according to a level of risk of an accident at the present moment.

The vehicle-mounted display system 2 continuously displays a driving state mark that is a reference graphic determined according to the derived "spare attentiveness level" and the derived "risk level" while the driver is driving the vehicle 5. Thus, the driver can continuously understand the driving state at the present moment. A configuration and a process of the vehicle-mounted display system 2 are, hereinafter, described in detail.

<2. Configuration of Vehicle-Mounted Display System>

Figure 2:
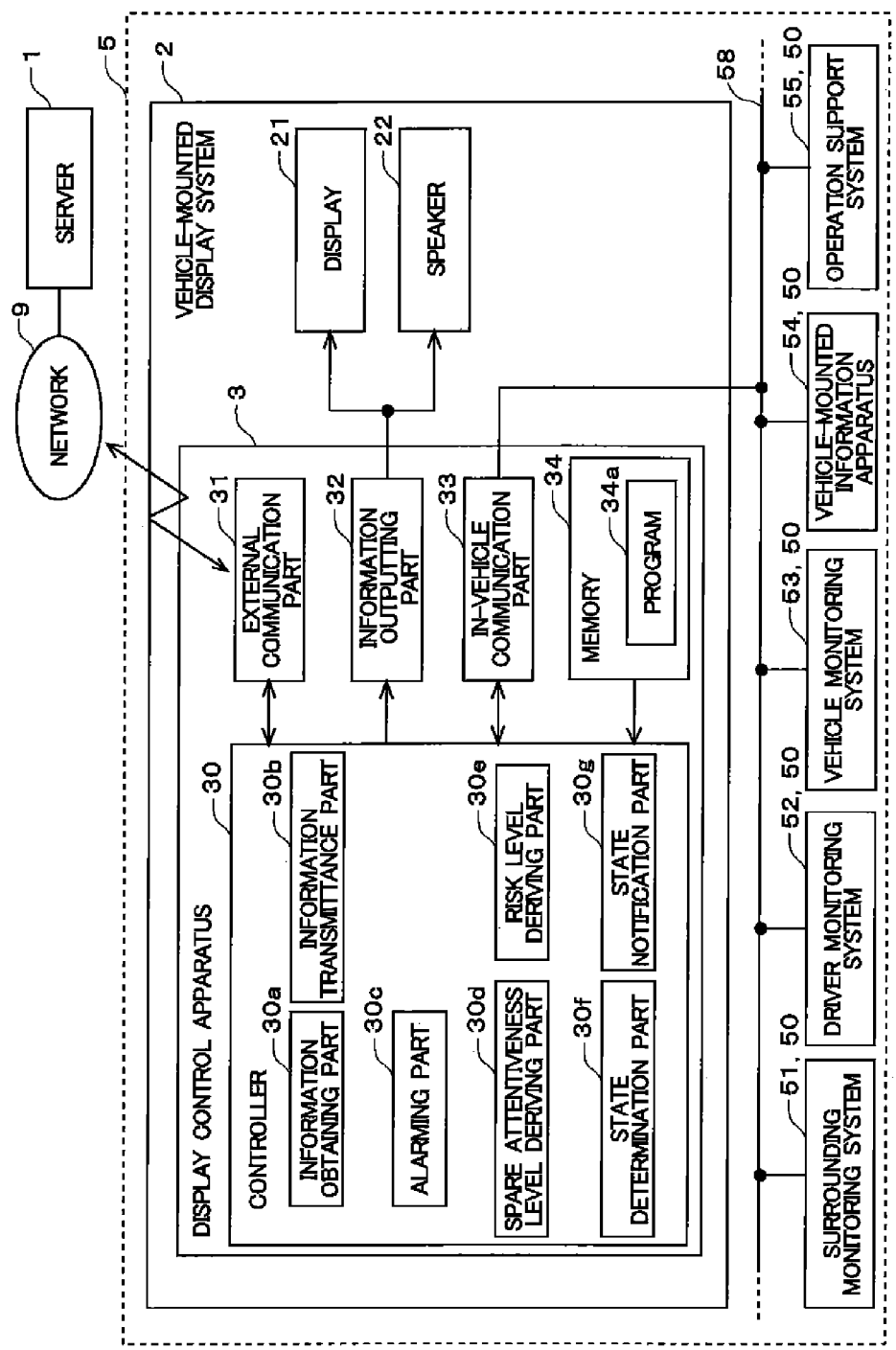
FIG. 2 shows a configuration of the vehicle-mounted display system.

FIG. 2 shows the configuration of the vehicle-mounted display system 2 and a configuration relating to the vehicle-mounted display system 2. The vehicle-mounted display system 2 includes a display 21, a speaker 22 and a display control apparatus 3.

Figure 3:
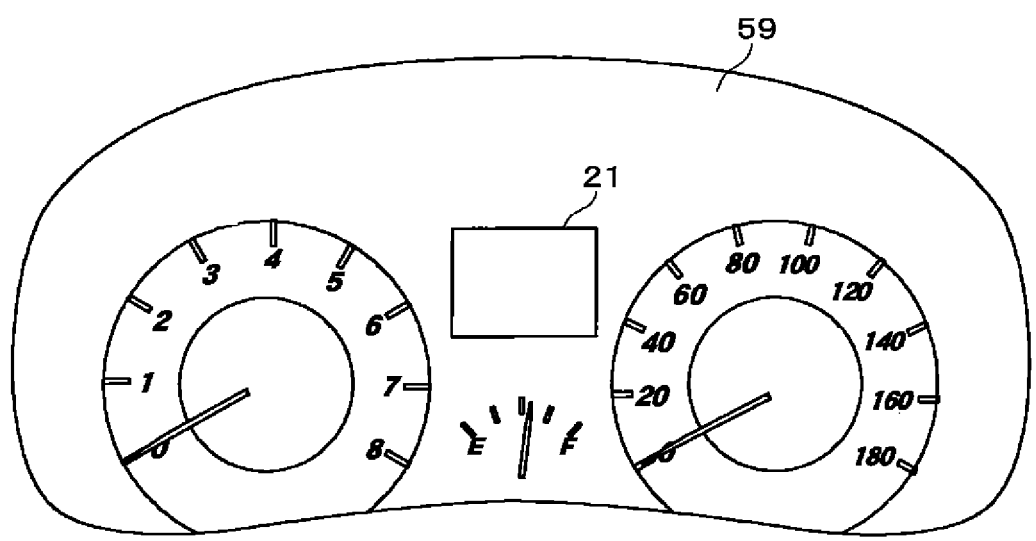
FIG. 3 shows a layout of a display.

The display 21 is a display apparatus that has a color liquid crystal display panel of a dot matrix method and that is configured to display various images including graphics, figures, diagrams, etc. in color. As shown in FIG. 3, the display 21 is disposed in an area for a meter panel 59 in the vehicle 5, such that the driver can see the display 21 easily. Thus, the display 21 provides information to the driver while driving the vehicle 5.

Moreover, the speaker 22 is disposed at an appropriate position of a cabin in the vehicle 5 and outputs various sounds to the cabin of the vehicle 5. Thus, the speaker 22 provides information to the driver while driving the vehicle 5.

The display control apparatus 3 controls operations of the display 21 and the speaker 22, and causes the display 21 to display an image and the speaker 22 to output a sound. The display control apparatus 3 includes an external communication part 31, an information outputting part 32, an in-vehicle communication part 33, a memory 34, and a controller 30.

The external communication part 31 includes a communication function using a wireless communication standard, such as LTE and iMAX, and communicates via the network 9. The display control apparatus 3 is configured to communicate information with the server 1 via the external communication part 31. It is recommended that the external communication part 31 should receive information not only from the particular server 1 but also from other communication devices connected to the network 9.

The information outputting part 32 sends an image signal to the display 21 and causes the display 21 to display an image relating to information of which the driver should be notified. Moreover, the information outputting part 32 sends a sound signal to the speaker 22 and causes the speaker 22 to output a sound relating to information of which the driver should be notified.

The in-vehicle communication part 33 is connected to the in-vehicle network 58, such as CAN, and communicates with the other electronic devices 50 disposed on the vehicle 5. The in-vehicle network 58 is connected to a surrounding monitoring system 51, a driver monitoring system 52, a vehicle monitoring system 53, a vehicle-mounted information apparatus 54 and an operation support system 55, as the electronic devices 50. The in-vehicle communication part 33 receives and sends signals including information from/to these electronic devices 50 via the in-vehicle network 58.

The surrounding monitoring system 51 monitors surroundings of the vehicle 5 and obtains information relating to an object (another vehicle, etc.) around the vehicle 5. The surrounding monitoring system 51 includes a radar system that detects a position of another vehicle in front and/or behind of the vehicle 5, a vehicle-mounted camera that captures an image the surrounding of the vehicle 5, a clearance sonar system that detects an object near the vehicle 5, etc.

The driver monitoring system 52 monitors the driver of the vehicle 5 and obtains information relating to a state of the driver. The driver monitoring system 52 includes an in-vehicle camera that captures an image of the driver, a biological sensor that detects biological information of the driver, etc. The biological sensor is disposed, for example, on a steering wheel or another portion that the driver directly touches. It is recommended that the biological sensor should be configured to obtain a variety of biological information, such as a heart rate, an amount of perspiration, electrocardiogram, a blood pressure, brain waves and a body temperature.

The vehicle monitoring system 53 monitors the vehicle 5 and obtains information relating to the vehicle 5. The vehicle monitoring system 53 includes a position sensor that obtains a position of the vehicle 5, a vehicle speed sensor that obtains a speed of the vehicle 5, an acceleration sensor that detects an acceleration of the vehicle 5, an operation sensor that detects a content and an amount of an operation made to an operation member (accelerator, brake, steering wheel, etc.) of the vehicle 5, a time measurement apparatus that measures driving time of the vehicle 5, etc.

The vehicle-mounted information apparatus 54 is a human-machine interface (HMI) through which the driver receives a variety of information. The vehicle-mounted information apparatus 54 includes a broadcast reception apparatus that receives airwaves of television and/or radio and provides an image and a sound to the driver, a reproducer that provides an image and a sound to the driver based on a record medium and/or data, a navigation apparatus that provides a route to a destination to the driver, etc. The broadcast reception apparatus and the reproducer provide entertainment contents not directly relating to driving, such as news, drama and music, to the driver.

The operation support system 55 assists the driver to make an operation by intervening in the operation by the driver. The operation support system 55 includes an automatic brake system that automatically applies brake based on the information obtained by the surrounding monitoring system 51 and a cruise control system that automatically keeps the speed of the vehicle 5 constant, etc.

Moreover, the memory 34 of the display control apparatus 3 stores a variety of information necessary for an operation of the vehicle-mounted display system 2. The memory 34, for example, is a non-volatile storage apparatus, such as flash memory. The memory 34 stores a program 34*a* for control. The program 34*a* is obtained by reading a recording medium, such as a memory card, and is recorded in the memory 34 beforehand. However, the program 34*a* may be obtained by another method, for example, by downloading from the communication device connected to the network 9.

The controller 30 is a microcomputer including, for example, a CPU, a RAM and a ROM and controls the vehicle-mounted display system 2 as a whole. Various functions necessary for the controller 30 are implemented by the CPU of the controller 30 executing the program 34*a* stored in the memory 34 (performs an arithmetic processing in accordance with the program 34*a*).

As shown in FIG. 2, some among functions of the controller 30 implemented by execution of the program 34*a* are an information obtaining part 30*a*, an information transmittance part 30*b*, an alarming part 30*c*, a spare attentiveness level deriving part 30*d*, a risk level deriving part 30*e*, a state determination part 30*f*, and a state notification part 30*g*.

The information obtaining part 30*a* obtains the variety of information, via the in-vehicle communication part 33, from the other electronic devices 50 connected to the in-vehicle network 58. The information obtaining part 30*a* obtains the information relating to the object around the vehicle 5 from the surrounding monitoring system 51, the information relating to the state of the driver from the driver monitoring system 52, the information relating to the vehicle 5 itself from the vehicle monitoring system 53, and the information relating to the contents to be provided to the driver from the vehicle-mounted information apparatus 54.

The information obtaining part 30a further obtains a variety of information from the server 1 via the external communication part 31. The information obtaining part 30a obtains information relating to characteristics of the driver from the server 1, information relating to weather of an area near a location of the vehicle 5, information relating to roads in the area near the location of the vehicle 5, and information relating to traffic congestion in the area near the location of the vehicle 5, etc. from the server 1. Further, the information obtaining part 30a may obtain a part of the information from a communication apparatus connected to the network 9 other than the server 1.

The information transmittance part 30b sends the information obtained by the information obtaining part 30a to the server 1, via the external communication part 31, regularly (e.g. every 10 minutes). The information transmittance part 30b associates the information with ID information of the driver of the vehicle 5 and sends the associated information. Thus, a variety of information relating to driving of the driver in the past is accumulated in the server 1. The information accumulated in the server 1 includes an average inter-vehicular distance kept by the driver while driving the vehicle 5, contents of the operations made to the operation members by the driver while driving, timings at which events have been handled by the driver while driving the vehicle 5, a type of a content selected by the driver while driving the vehicle 5. The server 1 determines a safe driving level, a response time, a taste (a type of a content that the driver prefers), etc. of the driver based on the information accumulated as described above and stores the determined results after associating the results with the ID information of the driver as the information relating to characteristics of the driver.

When a predetermined notification condition is satisfied, the alarming part 30c notifies the driver of warning information based on the information obtained by the information obtaining part 30a. When the predetermined notification condition is satisfied, the alarming part 30c sends the sound signal to the speaker 22 via the information outputting part 32 and causes the speaker 22 to output a sound serving as the warning information. The alarming part 30c provides the warning information to the driver, for example, when there is a possibility that the vehicle 5 will crash into another vehicle or when the vehicle 5 is located in an area where many accidents frequently occur or when the vehicle 5 is heading for a junction or a railroad crossing, or other cases.

The spare attentiveness level deriving part 30d and the risk level deriving part 30e derive parameters according to the driving state at the present moment, based on the information obtained by the information obtaining part 30a. The spare attentiveness level deriving part 30d derives "the spare attentiveness level," which is the parameter determined according to the state of the driver at the present moment. On the other hand, the risk level deriving part 30e derives "the risk level," which is the parameter determined according to the level of risk of an accident at the present moment.

The state determination part 30f determines the driving state at the present moment, based on the derived spare attentiveness level and the derived risk level. Moreover, the state determination part 30f enables or disables functions of the alarming part 30c and the vehicle-mounted information apparatus 54, according to the determined driving state.

The state notification part 30g notifies the driver of the driving state at the present moment based on the derived spare attentiveness level and the derived risk level. The state notification part 30g generates the driving state mark that is the reference graphic, determined according to the spare attentiveness level and the risk level, and causes the driving state mark to be displayed on the display 21.

<3. Derivation of Spare Attentiveness Level>

Next described is a method where the spare attentiveness level deriving part 30d derives "the spare attentiveness level," which is a parameter determined according to a state of the driver at the present moment. The spare attentiveness level is a parameter representing a load that the driver can accept in addition to a load exerted on the driver at the present moment (present load). In other words, the spare attentiveness level is a parameter representing a degree of a spare capacity relative to the load exerted on the driver at the present moment.

Figure 4:
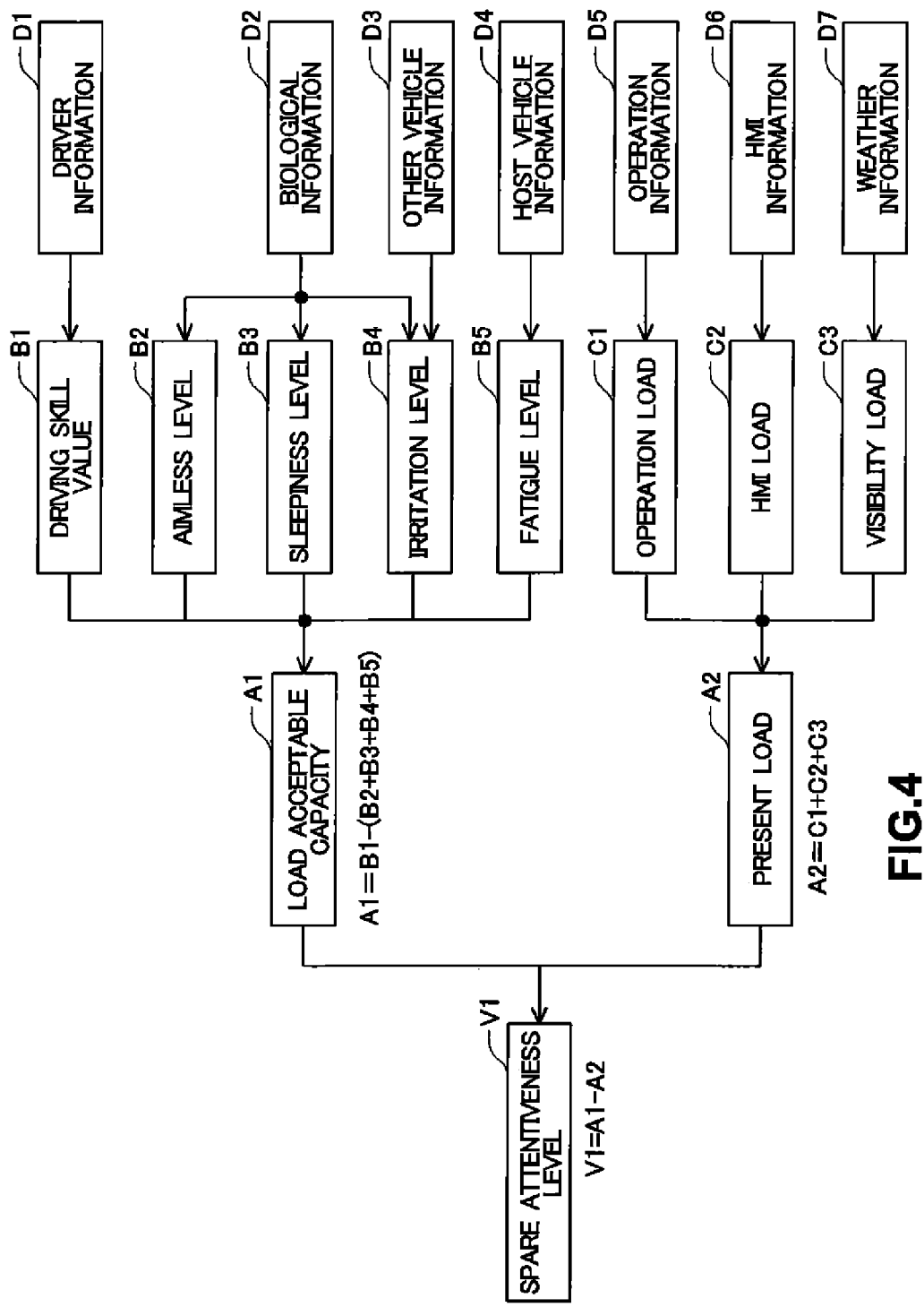
FIG. 4 shows a method of deriving a spare attentiveness level.

FIG. 4 shows a method where the spare attentiveness level deriving part 30d derives a spare attentiveness level V1. As shown in FIG. 4, the spare attentiveness level V1 is derived from a mathematical formula (1) below based on a load acceptable capacity A1 and the present load A2.

$$V1 = A1 - A2 \tag{1}$$

In other words, the spare attentiveness level V1 is a value calculated by subtracting the present load A2 from the load acceptable capacity A1. The load acceptable capacity A1 is a parameter representing the load that the driver can accept at the present moment. On the other hand, the present load A2 is a parameter representing a load exerted on the driver at the present moment. The spare attentiveness level V1 is normalized in a range from 0 to 100. When the present load A2 exceeds the load acceptable capacity A1, the spare attentiveness level V1 is not expressed in a negative figure but is expressed in "0."

The load acceptable capacity A1 is derived from a mathematical formula (2) below based on a driving skill value B1, an aimless level B2, a sleepiness level B3, an irritation level B4 and the fatigue level B5.

$$A1 = B1 - (B2 + B3 + B4 + B5) \tag{2}$$

The driving skill value B1 represents a driving capability of the driver. Generally, the higher the driving capability is, the larger a load acceptable, while driving the vehicle 5, by the driver is. Then, the load acceptable capacity A1 is derived by subtracting values representing levels of elements (the aimless level B2, the sleepiness level B3, the irritation level B4 and the fatigue level B5) that disturb the driving capability at the present moment from the driving skill value B1. Therefore, the higher the driving capability is, the larger the load acceptable capacity A1 is. Moreover, the higher the levels of elements that disturb the driving capability are, the smaller the load acceptable capacity A1 is.

The driving skill value B1 is derived based on driver information D1, such as the safe driving level and the response time. The driver information D1 is obtained from the server 1. The safe driving level is a value representing a safety level of the driving by the driver and is derived by the server 1 based on accumulated past information relating to the driver (inter-vehicular distance, etc.). The reaction time is a value representing a time that the driver takes to react to an event and is derived by the server 1 based on the accumulated past information relating to the driver.

The aimless level B2 is a value representing a level of aimlessness of the driver at the present moment. The sleepiness level B3 is a value representing a level of sleepiness of the driver at the present moment. The aimless level B2 and the sleepiness level B3 are derived based on biological information D2, such as a heart rate, an amount of perspiration, electrocardiogram, a blood pressure, brain waves and a body temperature. The biological information D2 is obtained from the biological sensor included in the driver monitoring system 52.

The irritation level B4 is a value representing a level of irritation of the driver at the present moment. The irritation level B4 is derived in consideration of other vehicle information D3 in addition to a biological information D2. The other vehicle information D3 is information relating to one or more vehicles around the vehicle 5 and includes an inter-vehicular distance to a rear vehicle, a traffic congestion level, etc. The inter-vehicular distance to the rear vehicle is an inter-vehicular distance to another vehicle traveling behind of the vehicle 5 and is obtained from the radar system included in the surrounding monitoring system 51. Moreover, the traffic congestion level is a value representing a level of traffic congestion in the area near the location of the vehicle 5 and is obtained from the server 1.

The fatigue level B5 is a value representing a level of fatigue of the driver at the present moment. The fatigue level B5 is derived based on host vehicle information D4, such as driving time and an accumulated operation amount. The driving time is, for example, a time passed from turning-on of an ignition switch and is obtained from the time measurement apparatus included in the vehicle monitoring system 53. Moreover, the accumulated operation amount is an amount of the operations made to the operation members accumulated from a start of driving of the driver and is obtained by integrating the operation amount detected by the operation sensor included in the vehicle monitoring system 53 by time.

The present load A2 is derived from a mathematical formula (3) below based on an operation load C1, a HMI load C2 and a visibility load C3.

$$A2=C1+C2+C3 \tag{3}$$

In other words, the present load A2 is derived by adding the three types of loads (the operation load C1, the HMI load C2 and the visibility load C3) exerted on the driver at the present moment.

The operation load C1 is a load caused by the operations made by the driver to the operation members (accelerator, brake, steering wheel, etc.) of the vehicle 5. The operation load C1 is derived based on operation information D5, such as the amount of the operations made to the operation members. The operation information D5 is obtained from the operation sensor included in the vehicle monitoring system 53.

The HMI load C2 is a load caused by receipt by the driver of information from the HMI (the vehicle-mounted information apparatus 54, etc.). The HMI load C2 is derived based on HMI information D6, such as a content type and a provided information amount. The content type is a type of contents provided to the driver (news, drama, music, etc.). The provided information amount is an amount of information, such as contents, provided to the driver. The HMI information D6 is obtained from the vehicle-mounted information apparatus 54. Moreover, when the HMI load C2 is derived, an amount and a content of a conversation between the driver and a passenger and/or a conversation of the driver on telephone may be further taken into consideration.

The visibility load C3 is a load caused by a visibility of the driver (a distance at which an object can be clearly discerned with naked eyes). The shorter the visibility outside of the vehicle 5 is (the poorer visibility the driver has), the higher the visibility load C3 is. The visibility load C3 is derived based on weather information D7, such as weather and an illuminance. The weather is weather of the area near the location of the vehicle 5 (sunny, rainy, cloudy, etc.) and the illuminance is brightness of the area near the location of the vehicle 5. The weather information D7 is obtained from the server 1.

<4. Derivation of Risk Level>

Next prescribed is a method where the risk level deriving part 30e derives "the risk level" that is a parameter determined according to the level of risk of an accident at the present moment. In other words, the risk level is a parameter determined according to a degree of an accident that may occur at the present moment.

Figure 5:
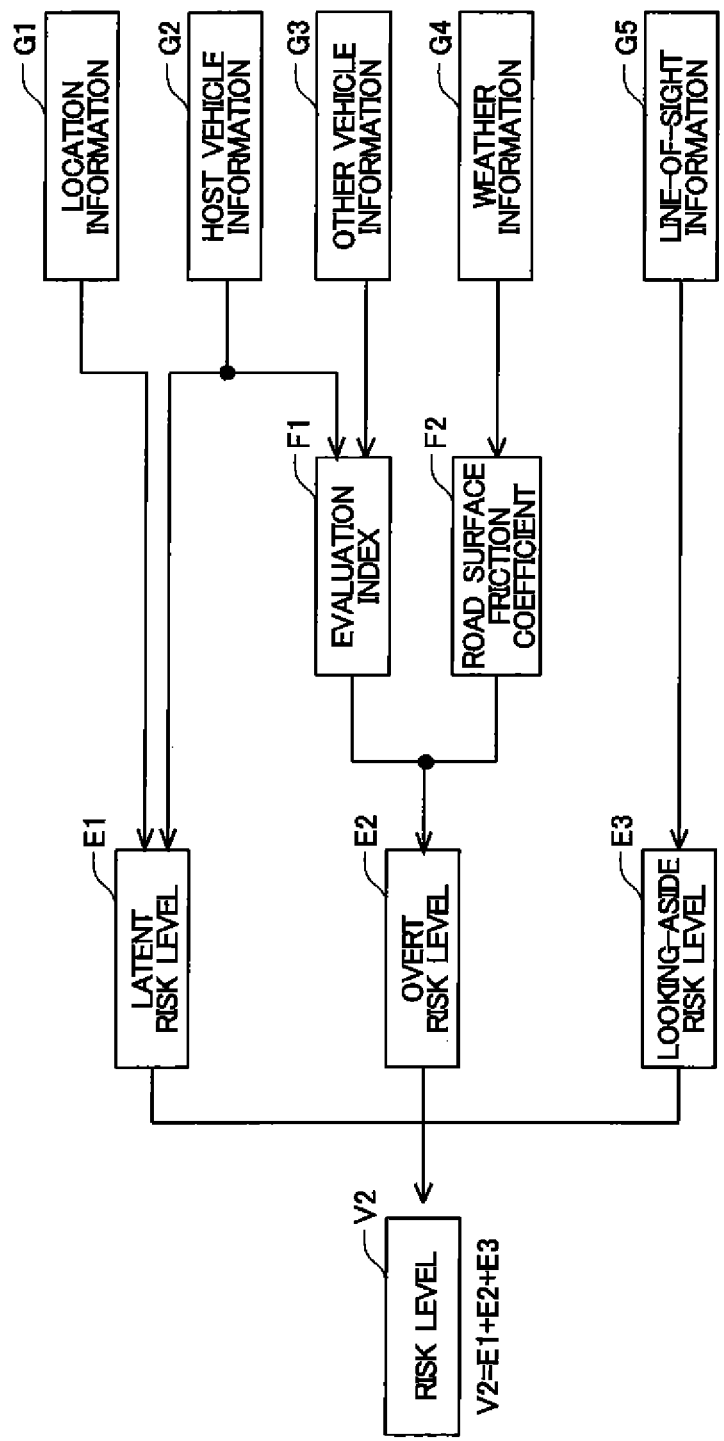
FIG. 5 shows a method of deriving a risk level.

FIG. 5 shows a method where the risk level deriving part 30e derives a risk level V2. As shown in FIG. 5, the risk level V2 is derived from a mathematical formula (4) below based on a latent risk level E1, an overt risk level E2 and a looking-aside risk level E3.

$$V2=E1+E2+E3 \tag{4}$$

In other words, the risk level V2 is derived by adding parameters determined according to the three types of risk levels (the latent risk level E1, the overt risk level E2 and the looking-aside risk level E3) at the present moment. The risk level V2 is also normalized in a range from 0 to 100.

The latent risk level E1 is a parameter determined according to a risk level attributed to traveling of only the vehicle 5 and is irrelevant to an object around the vehicle 5. The latent risk level E1 is derived based on a location information G1, such as a location accident rate, and on the host vehicle information G2, such as a host vehicle speed and a host vehicle acceleration. The location accident rate is a rate of accidents that have occurred on a road near the location of the vehicle 5. Moreover, the host vehicle speed is a speed of the vehicle 5 at the present moment and the host vehicle acceleration is an acceleration of the vehicle 5 at the present moment. The location information G1 is obtained from the server 1 and the host vehicle information G2 is obtained from the vehicle monitoring system 53.

The overt risk level E2 is a parameter determined according to a risk level attributed to the relationship between the vehicle 5 and the object around the vehicle 5. The overt risk level E2 is derived based on an evaluation index F1 and a road surface friction coefficient F2.

The evaluation index F1 is an index generally used for evaluation of a risk level of collision into a front obstacle, such as time to collision (TTC) and stopping distance (SD). The evaluation index F1 is derived based on the host vehicle information G2 and other vehicle information G3. The other vehicle information G3 includes a relative speed, an inter-vehicular distance, a lateral location, etc. of another vehicle traveling in front of the vehicle 5. The other vehicle information G3 is obtained from the radar system of the surrounding monitoring system 51.

The road surface friction coefficient F2 is a friction coefficient ($\mu$) of a road on which the vehicle 5 travels. The road surface friction coefficient F2 is derived based on weather information G4, such as weather and an outside air temperature. The weather is weather (sunny, rainy, cloudy, etc.) of an area near the location of the vehicle 5. The outside air temperature is a temperature of an area near the location of the vehicle 5. The weather information G4 is obtained from the server 1.

The looking-aside risk level E3 is a parameter determined according to a risk level attributed to inattentive driving of the driver. The looking-aside risk level E3 is derived based on a line-of-sight information G5 such as a direction of line of sight of the driver and a direction of the face of the driver.

The line-of-sight information G5 is obtained based on the image captured by the in-vehicle camera of the driver monitoring system 52.

<5. Determination of Driving State>

The state determination part 30f determines the driving state at the present moment based on the spare attentiveness level V1 and the risk level V2 derived as mentioned above. A procedure performed by the state determination part 30f is hereinafter described.

Figure 6:
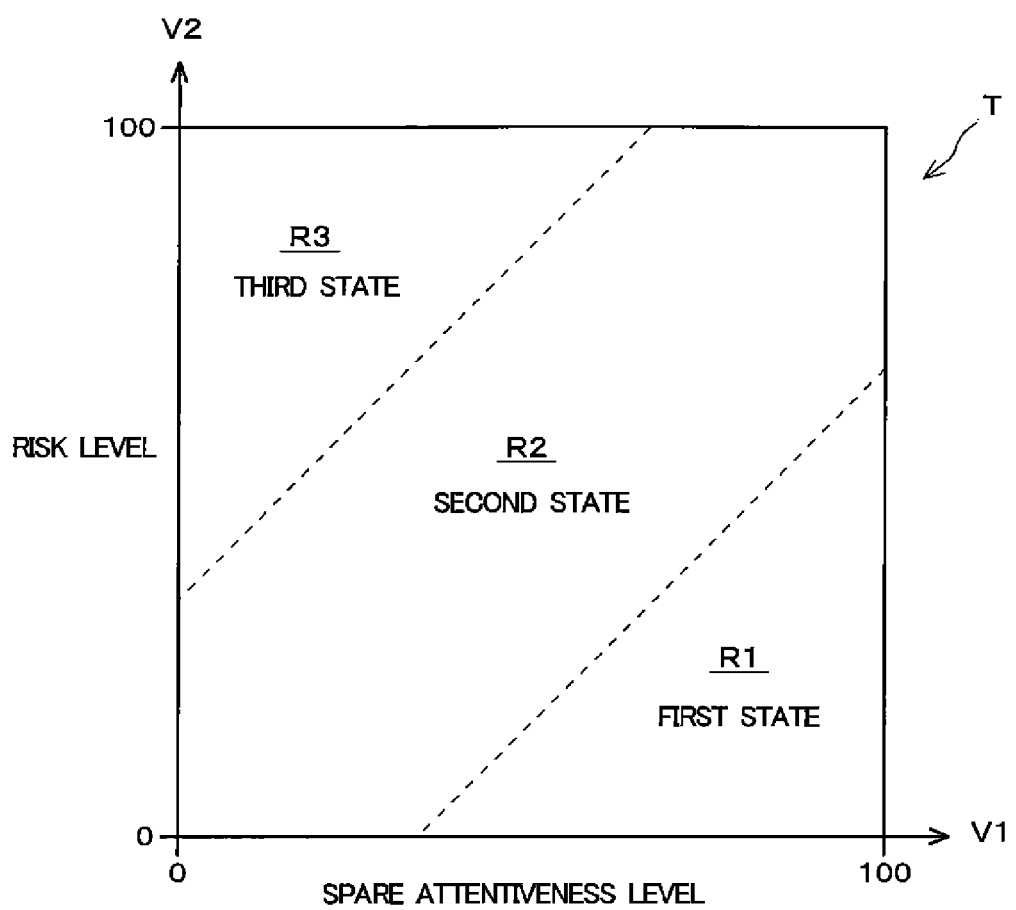
FIG. 6 shows a state determination chart used for determining a driving state.

FIG. 6 shows a state determination chart T used, for determination of the driving state. A horizontal axis of the state determination chart T represents the spare attentiveness level V1. A vertical axis represents the risk level V2. As shown in FIG. 6, the state determination chart T is divided into three regions and each of the regions corresponds to one of driving states (first state, second state, and third state) different from one another.

A lower right region R1 of the chart in FIG. 6 represents the first state where the spare attentiveness level V1 is relatively high and where the risk level V2 is relatively low. The first state is a state where the driver has enough spare attentiveness and where a possibility of an accident is low. Thus, the first state can be considered as a relatively safe driving state. On the other hand, an upper left region R3 of the chart in FIG. 6 represents the third state, where the spare attentiveness level V1 is relatively low and where the risk level V2 is relatively high. The third state is a state where spare attentiveness of the driver is little and where a possibility of an accident is high. Therefore, the third state can be considered as a relatively dangerous driving state. Moreover, a region R2 located between the region R1 and the region R3 represents the second state. The second state can be considered as a normal driving state.

Referring to the state determination chart T, the state determination part 30f identifies a corresponding point in the state determination chart T at which the derived spare attentiveness level V1 and the derived risk level V2 intersect. Then, the state determination part 30f determines in which of the first state, the second state or the third state the driving state is at the present moment, based on the region where the corresponding point is located.

Moreover, the state determination part 30f enables or disables functions of the alarming part 30c and the vehicle-mounted information apparatus 54, in accordance with the determined driving state. Thus, functions suitable to the driving state at the present moment are provided to the driver. Therefore, driver distraction can be reduced.

In a case where the driving state is in the first state, the driving state is relatively safe and the driver has sufficient spare attentiveness. Thus, if the driver is notified of warning information relating to the driving of the driver, the driver may feel the information peskily. Therefore, the state determination part 30f disables the function of the alarming part 30c that informs the driver of the warning information. Moreover, the state determination part 30f enables the function of the vehicle-mounted information apparatus 54 that provides contents to the driver.

In a case where the driving state is in the second state, the driving state is normal. The state determination part 30f enables both of the function of the vehicle-mounted information apparatus 54 that provides contents and of the function of the alarming part 30c that informs the driver of the warning information.

In a case where the driving state is in the third state, the driving state is relatively dangerous and spare attentiveness of the driver is little. Thus, if the contents are provided, the spare attentiveness level may be lowered further. Therefore, the state determination part 30f disables the function of the vehicle-mounted information apparatus 54 of providing contents. Moreover, the state determination part 30f enables the function of the alarming part 30c of informing the driver of the warning information. In addition, in a case where the driving state is in the third state, the state determination part 30f may enable the function of the operation support system 55 to cause the operation support system 55 to assist the driver to make an operation.

<6. Display of Driving State Mark>

Moreover, the state notification part 30g causes the driving state mark that is the reference graphic to be displayed on the display 21, in accordance with the derived spare attentiveness level V1 and the derived the risk level V2. A procedure performed by the state notification part 30g is hereinafter described.

Figure 7:
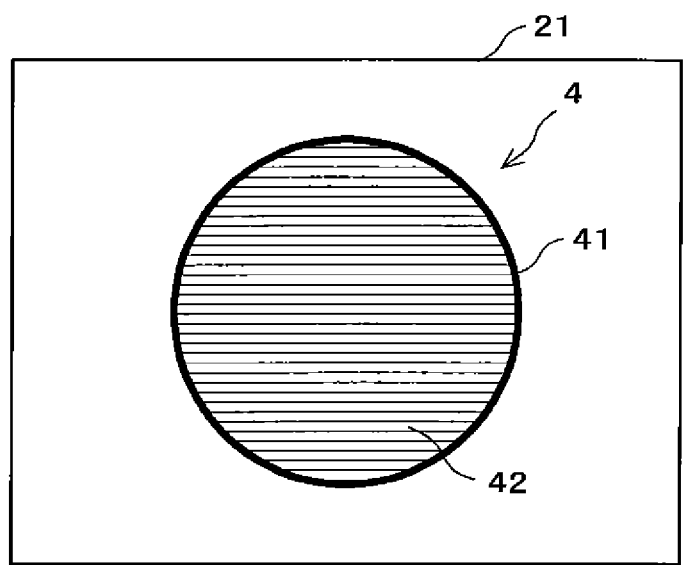
FIG. 7 shows a driving state mark being displayed.

FIG. 7 shows that a driving state mark 4 is being displayed on the display 21. As described above, the display 21 is disposed in the area for the meter panel 59 (refer to FIG. 3). Therefore, the driver can easily see the driving state mark 4. Moreover, the driving state mark 4 is continuously displayed on the display 21 while the driver is driving the vehicle 5. Thus, the driver can drive, constantly paying attention to the displayed driving state mark 4.

As shown in FIG. 7, the driving state mark 4 is a circle graphic having an outer frame 41 serving as an outer edge. Moreover, an inner region 42 of the driving state mark 4 is colored. A size of the outer frame 41 of the driving state mark 4 and a color (color hue) of the inner region 42 of the driving state mark 4 depend on the parameters reflecting the driving state at the present moment.

Figure 8:
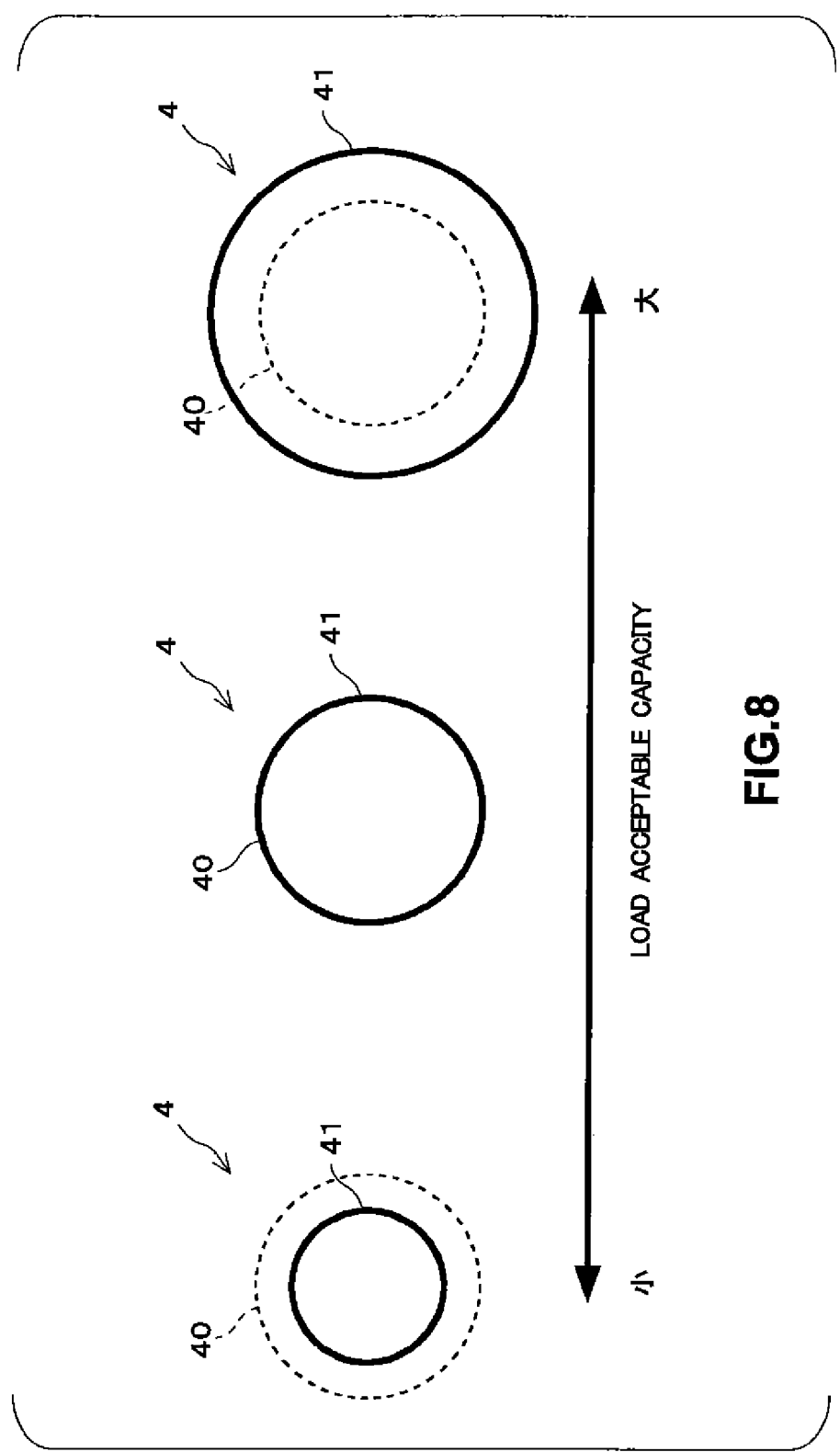
FIG. 8 is a drawing for explanation of change of a size of the driving state mark.

FIG. 8 is a drawing for explanation of change of the size of the outer frame 41 of the driving state mark 4 (hereinafter referred to simply as "the size of the driving state mark 4"). The size of the driving state mark 4 is determined in accordance with the load acceptable capacity A1. In FIG. 8, a dashed line 40 shows a size of the driving state mark 4 corresponding to a standard load acceptable capacity A1.

As shown on a right side of FIG. 8, the larger the load acceptable capacity A1 is, the larger the size of the driving state mark 4 is. Moreover, as shown on a left side of FIG. 8, the smaller the load acceptable capacity A1 is, the smaller the size of the driving state mark 4 is. For example, in a case where the driving capability of the driver is relatively high, the size of the driving state mark 4 is relatively large. In a case where the levels of the elements that disturb the driving capability are relatively high, the size of the driving state mark 4 is relatively small. Therefore, the driver can intuitively understand the load acceptable capacity A1 at the present moment by paying attention to the size of the driving state mark 4.

Figure 9:
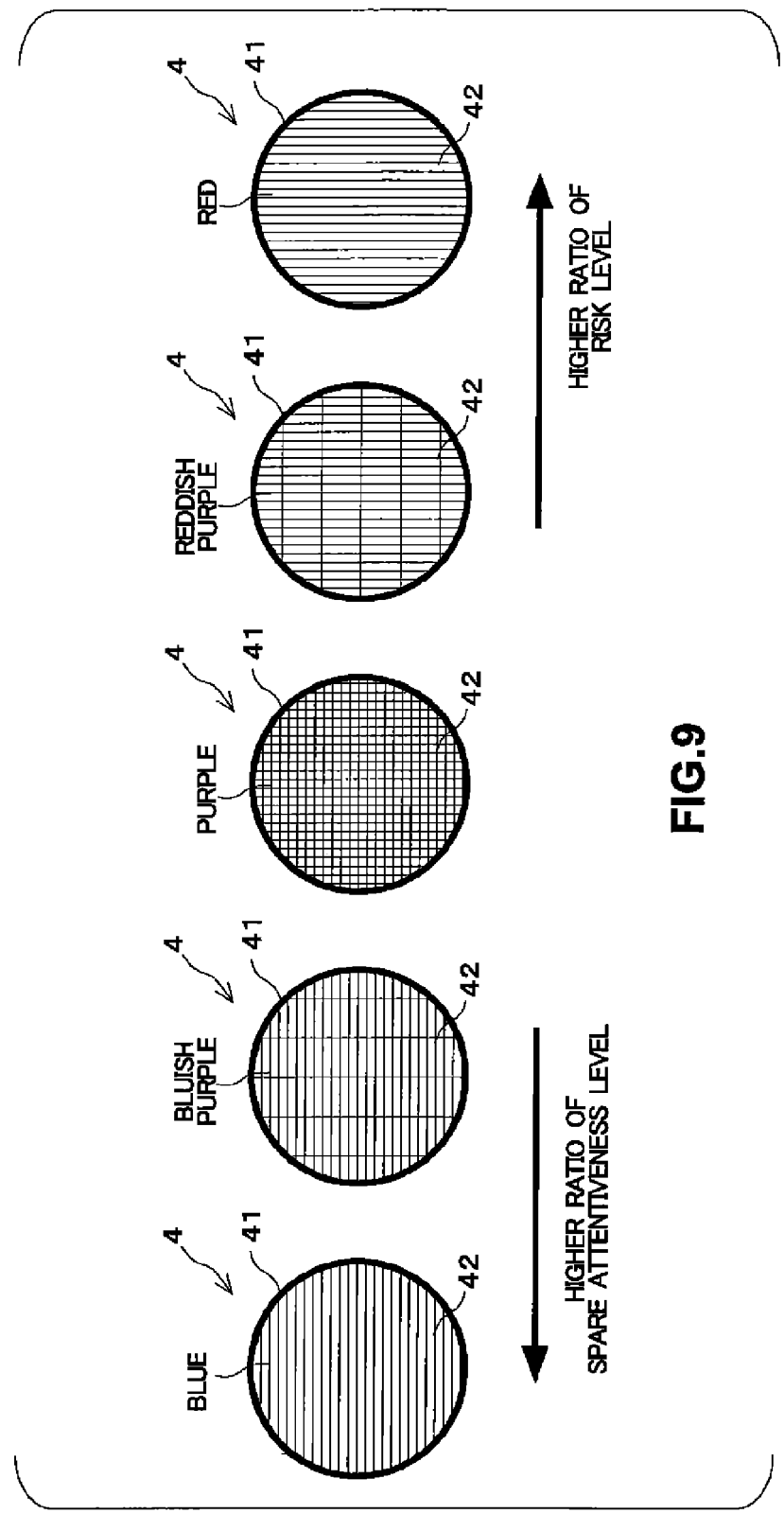
FIG. 9 is a drawing for explanation of change of a color of the driving state mark.

FIG. 9 is a drawing for explanation of change of the color of the inner region 42 of the driving state mark 4 (hereinafter referred to simply as "the color of the driving state mark 4"). The driving state mark 4 expresses the spare attentiveness level V1 in "blue" and the risk level V2 in "red" respectively. The color of the driving state mark 4 represents a relative relationship between the spare attentiveness level V1 and the risk level V2, and the color is generated by mixing the "blue" of the spare attentiveness level V1 and the "red" of the risk level V2.

More concretely, the color of the driving state mark 4 is a color determined according to a ratio of the spare attentiveness level V1 and the risk level V2. A value of the color hue of the driving state mark 4 is derived by linear interpolation based on a value of a color hue corresponding to complete "blue," a value of a color hue corresponding to complete "red" and the ratio between the spare attentiveness level V1 and the risk level V2.

When the values of the spare attentiveness level V1 and the risk level V2 are the same, the color of the driving state mark 4 is "purple." For example, when both values of the spare attentiveness level V1 and the risk level V2 are "50," the color of the driving state mark 4 is "purple."

As shown on a left side of FIG. 9, as the ratio of the spare attentiveness level V1 to the risk level V2 becomes higher, the color of the driving state mark 4 becomes closer to blue. For example, when the spare attentiveness level V1 is "50" and the risk level V2 is "25," the color of the driving state mark 4 is "bluish purple." Moreover, when the spare attentiveness level V1 is "50" and the risk level V2 is "0," the color of the driving state mark 4 is completely "blue."

On the other hand, as shown on a right side of FIG. 9, as the ratio of the risk level V2 to the spare attentiveness level V1 becomes higher, the color of the driving state mark 4 becomes closer to "red." For example, when the spare attentiveness level V1 is "25" and the risk level V2 is "50," the color of the driving state mark 4 is "reddish purple." Moreover, when the spare attentiveness level V1 is "0" and the risk level V2 is "50," the color of the driving state mark 4 is completely "red."

Here, the state determination chart T in FIG. 6 is referred. As the corresponding point at which the derived spare attentiveness level V1 and the derived risk level V2 intersect becomes closer to lower right of the state determination chart T, the color of the driving state mark 4 becomes closer to "blue." Contrarily, as the corresponding point becomes closer to upper left of the state determination chart T, the color of the driving state mark 4 becomes closer to "red." Therefore, in a case where the driving state is the first state, the color of the driving state mark 4 is closer to "blue." In a case where the driving state is the second state, the color of the driving state mark 4 is close to "purple." In a case where the driving state is the third state, the color of the driving state mark 4 is close to "red." Thus, the driver can intuitively understand a relationship between the spare attentiveness level V1 and the risk level V2 at the present moment by paying attention to the color of the driving state mark 4. In other words, the driver can intuitively understand the driving state at the present moment.

While the vehicle-mounted display system 2 is on, the state notification part 30g repeats a procedure for generating the driving state mark 4 reflecting in real time the spare attentiveness level V1, the risk level V2 and the load acceptable capacity A1 at the present moment and for causing an image including the driving state mark 4 to be displayed on the display 21. Thus, while the driver is driving the vehicle 5, the driving state mark 4 as described above is continuously displayed on the display 21. Therefore, the driver can continuously and intuitively understand the spare attentiveness level V1, the risk level V2 and the load acceptable capacity A1 at the present moment. Continuously paying attention to the displayed driving state mark 4, the driver can drive with a sense of tension so that the driver can drive the vehicle 5 safely.

Moreover, when the driving state determined by the state determination part 30f is changed from the second state to the third state, the state notification part 30g causes the speaker 22 to output a predetermined warning sound. Since the third state is the state where spare attentiveness of the driver is little and where the possibility of an accident is high, it may be difficult for the driver to pay attention to the driving state mark 4. Thus, it is possible to cause the driver to realize that the driving state at the present moment is the relatively dangerous third state by outputting such a warning sound from the speaker 22. Moreover, a similar warning sound may be output from the speaker 22 when the present load A2 exceeds the load acceptable capacity A1.

<7. Operation of Vehicle-Mounted Display System>

Figure 10:
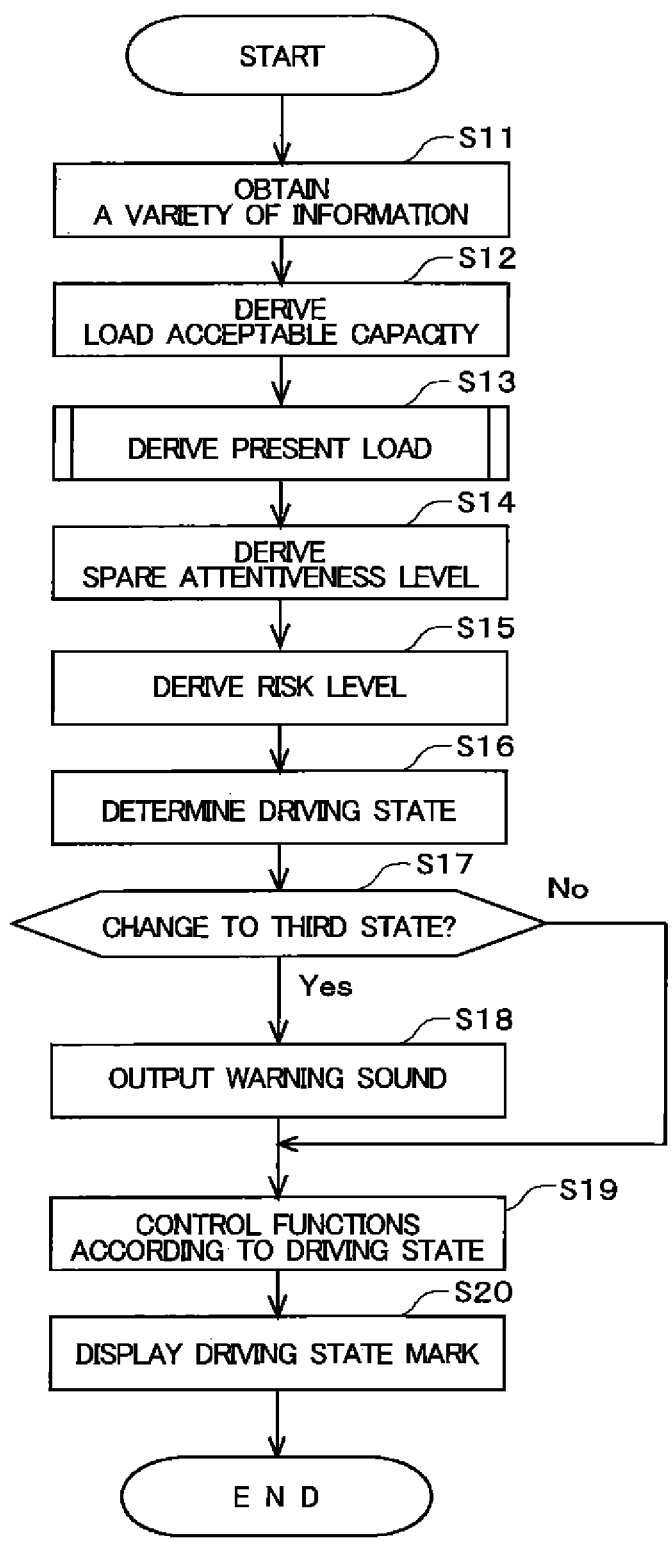
FIG. 10 shows a flowchart for an operation performed by the vehicle-mounted display system.

Next, an operation of the vehicle-mounted display system 2 is explained. FIG. 10 shows a flowchart for the operation of the vehicle-mounted display system 2. When the vehicle-mounted display system 2 is activated, first, the information obtaining part 30a identifies the driver of the vehicle 5 and obtains the ID information of the driver. The information obtaining part 30a is configured to identify the driver based on, for example, an image of the driver captured by the in-vehicle camera of the driver monitoring system 52. Moreover, if the vehicle 5 includes an authentication system that performs authentication such as personal authentication by using, for example, an IC card, and biometric authentication, the driver may be identified by using an authentication result performed by the authentication system. After identifying the driver in such a method, the vehicle-mounted display system 2 repeats the operation shown in FIG. 10 in a predetermined cycle (e.g. cycle of one second).

First, the information obtaining part 30a obtains a variety of information necessary for derivation of the spare attentiveness level V1 and the risk level V2 (a step S11). The information obtaining part 30a obtains the information from the electronic devices 50 connected to the in-vehicle network 58, the server 1 connected to the network 9, etc. When obtaining the information from the server 1, the information obtaining part 30a sends a request signal to the server 1. The request signal includes the ID information of the driver of the vehicle 5, a location of the vehicle 5 at the present moment, etc. Thus, the information obtaining part 30a obtains the information D1 to D7 shown in FIG. 4 and the information G1 to G5 shown in FIG. 5.

Next, the spare attentiveness level deriving part 30d derives the load acceptable capacity A1, as shown in FIG. 4, based on the driver information D1, the biological information D2, the other vehicle information D3 and the host vehicle information D4 (a step S12). Moreover, the spare attentiveness level deriving part 30d derives the present load A2, as shown in FIG. 4, based on the operation information D5, the HMI information D6 and the weather information D7 (a step S13). Then, the spare attentiveness level deriving part 30d derives a difference between the load acceptable capacity A1 and the present load A2, as the spare attentiveness level V1 (a step S14). A procedure for deriving the present load A2 performed in the step S13 is described later.

Next, the risk level deriving part 30e derives the risk level V2, as shown in FIG. 5, based on the location information G1, the host vehicle information G2, the other vehicle information G3, the weather information G4 and the line-of-sight information G5 (a step S15).

Next, the state determination part 30f determines in which of the first state, the second state or the third state the driving state is at the present moment, based on the derived spare attentiveness level V1 and the derived risk level V2 (a step S16). In a case where the driving state is changed from the second state determined in the previous cycle to the third state this time (yes in the step S17), the state notification part 30g outputs the predetermined warning sound from the speaker 22 (a step S18).

Next, the state determination part 30f enables or disables the functions of the alarming part 30c and the vehicle-mounted information apparatus 54, according to the determined driving state (a step S19). Thus, a function suitable to the driving state at the present moment is provided to the driver.

Next, the state notification part 30g generates the driving state mark 4 reflecting the derived spare attentiveness level V1, the derived risk level V2 and the derived load acceptable capacity A1, based on these parameters. Then the state notification part 30g causes the image including the generated driving state mark 4 to be displayed on the display 21 (a step S20).

The operation as shown in FIG. 10 is repeated in the predetermined cycle while the vehicle-mounted display system 2 is on (from turning-on to turning-off of the ignition switch). Thus, the driving state mark 4 reflecting in real time the spare attentiveness level V1, the risk level V2 and the load acceptable capacity A1 at the present moment is continuously displayed on the display 21.

Figure 11:
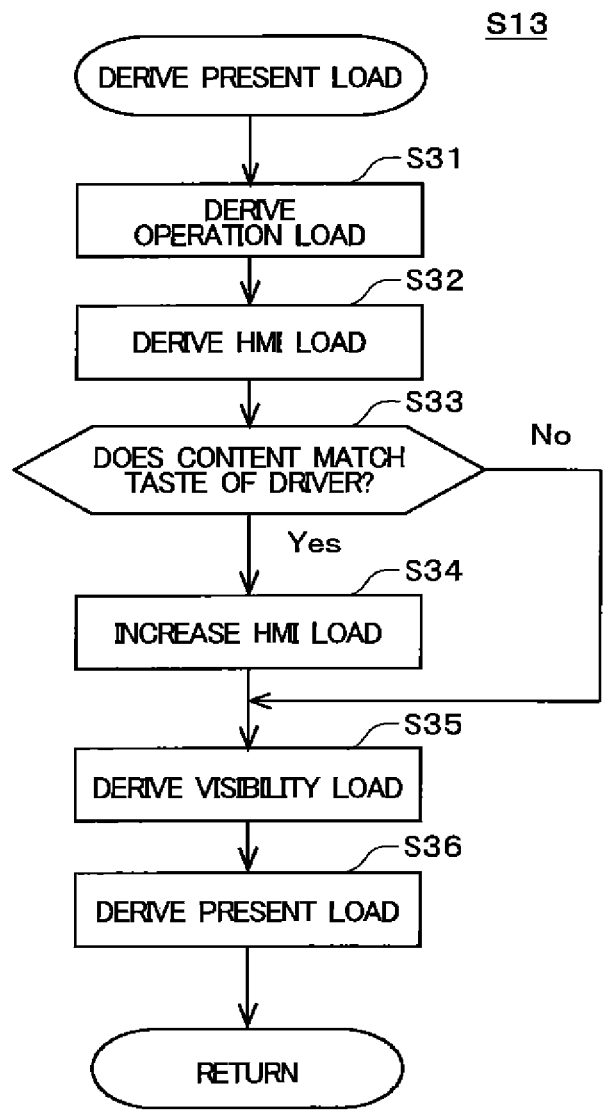
FIG. 11 shows a flowchart of a procedure for deriving a present load.

Next, the procedure for deriving the present load A2 in the step S13 is explained in detail. FIG. 11 shows a flowchart of the procedure performed by the spare attentiveness level deriving part 30d to derive the present load A2.

First, the spare attentiveness level deriving part 30d derives the operation load C1 based on the operation information D5 (a step S31). Next, the spare attentiveness level deriving part 30d derives the HMI load C2 based on the HMI information D6 (a step S32). Then, the spare attentiveness level deriving part 30d determines whether or not the content type (type of a content provided to the driver at the present moment) included in the HMI information D6 matches a taste of the driver (a step S33).

For example, in a case where the driver is interested in "share prices" and the type of the content is news relating to the "share prices," the type of the content matches the taste of the driver. Moreover, for example, in a case where the driver is interested in a particular artist and where the type of the content is music of the artist, the type of the content matches the taste of the driver. Information showing the taste of the driver may be obtained by the information obtaining part 30a from the server 1 along with other information in the step S11 shown in FIG. 10.

As described above, in the case where the type of the content matches the taste of the driver, the driver pays more attention to the content as compared with a normal state. Thus, the HMI load C2 that is the load caused by receipt by the driver of information from the HMI is larger than the normal state.

Therefore, in the case where the type of the content matches the taste of the driver (yes in the step S33), the spare attentiveness level deriving part 30d increases the HMI load C2 derived in the step S32 (a step S34). For example, the spare attentiveness level deriving part 30d sets a result obtained by multiplying the HMI load C2 by a coefficient larger than 1, as a newly derived HMI load C2. It is recommended that the coefficient to be multiplied should be a value determined according to a matching level of the type of a content with the taste of the driver, or intensity of the taste of the driver for the type of the content.

Next, the spare attentiveness level deriving part 30d derives the visibility load C3 based on the weather information D7 (a step S35). Then, the spare attentiveness level deriving part 30d derives the present load A2 by adding the derived operation load C1, the derived HMI load C2 and the derived visibility load C3 (a step S36).

As described above, the spare attentiveness level deriving part 30d determines whether or not the content provided to the driver matches the taste of the driver and derives the present load A2 based on the determined result. Therefore, the present load A2 can be derived correctly.

As described above, in the vehicle-mounted display system 2, the spare attentiveness level deriving part 30d derives the spare attentiveness level V1 that is the parameter determined according to a present state of the driver, and the risk level deriving part 30e derives the risk level V2 that is the parameter determined according to the risk level of an accident at the present moment. Then, the display 21 continuously displays the driving state mark 4 that is the reference graphic, determined according to the spare attentiveness level V1 and the risk level V2, while the driver is driving the vehicle 5. Thus, the driver can continuously understand the own state and the risk level of an accident at the present moment. Therefore, continuously paying attention to the displayed driving state mark 4, the driver can drive with a sense of tension so that the driver can drive the vehicle 5 safely.

Moreover, it is recommended that the driving state mark 4 should be constantly displayed on the display 21 while the driver is driving the vehicle 5. However, if the driving state mark 4 can be continuously displayed, different information, instead of the driving state mark 4, may be displayed on the display 21, in accordance with an operation, setup, etc. by the driver. For example, an eco-drive mark showing a level of eco-friendly driving and other marks may be displayed on the display 21 instead of the driving state mark 4 in accordance with the operation by the driver. Moreover, the driving state mark 4 and the different information (e.g. eco-drive mark) may be switched over in a predetermined cycle to be displayed on the display 21.

<8. Modifications>

As described above, the embodiment of the invention is explained. However, the invention is not limited to the embodiment described above but various modifications are possible. Such a modification is hereinafter described. All the forms including the embodiment described above and the modifications described below may be arbitrarily combined.

In the foregoing embodiment, the driving state mark 4 represents the relative relationship between the spare attentiveness level V1 and the risk level V2 with the color of the inner region 42. On the other hand, the inner region 42 of the driving state mark is divided into two regions and the relative relations between the spare attentiveness level V1 and the risk level V2 by a ratio of areas of the two regions.

FIG. 12 shows examples of a driving state mark 4a that shows the relative relationship between the spare attentiveness level V1 and the risk level V2 by a ratio of areas of two regions. As shown in FIG. 12, an inner region 42 of the driving state mark 4a is divided into two regions 42a and 42b by a border line 43. The first region 42a corresponds to the spare attentiveness level V1 and a color of the first region 42a is "blue." Moreover, the other second region 42b corresponds to the risk level V2 and a color of the second region 42b is "red." A ratio of areas between the first region 42a and the second region 42b of the inner region 42 matches a ratio between the spare attentiveness level V1 and the risk level V2.

When a value of the spare attentiveness level V1 is the same as a value of the risk level V2, the areas of the two regions 42a and 42b are same. Moreover, as shown in a left side of FIG. 12, the higher a ratio of the spare attentiveness level V1 relative to the risk level V2 is, the higher a ratio of the area of the first region 42a to the area of the second region 42b is. If the value of the risk level V2 is "0," the first region 42a accounts for entire inner region 42 of the driving state mark 4. On the other hand, as shown in a right side of FIG. 12, the higher a ratio of the risk level V2 relative to the spare attentiveness level V1 is, the higher a ratio of the area of the second region 42*b* to the area of the first region 42*a* is. If the value of the spare attentiveness level V1 is "0," the second region 42*b* accounts for entire inner region 42 of the driving state mark 4.

As described above, the ratio between the spare attentiveness level V1 and the risk level V2 is represented by the ratio of the areas of the driving state mark 4*a*. Thus, the driver can clearly understand the relationship between the spare attentiveness level V1 and the risk level V2 at the present moment. If the ratio of the areas between the spare attentiveness level V1 and the risk level V2 can be shown clearly by the ratio of the areas, a layout of the two regions 42*a* and 42*b* may be different from the ones shown in FIG. 12. For example, the border line 43 may be a straight line. Moreover, the first region 42*a* and the second region 42*b* may be divided into some portions to be disposed alternately such that the inner region 42 is striped.

Further, in the foregoing embodiment, the driving state mark 4 is a circle. However, the driving state mark 4 may be another shape, such as a square, a cylinder, a sphere, etc.

Further, in the foregoing embodiment, the driving state mark 4 shows both the spare attentiveness level V1 and the risk level V2 in one graphic. However, the spare attentiveness level V1 and the risk level V2 may be shown in graphics separated from each other.

Further, in the foregoing embodiment, the driving state mark 4 shows the spare attentiveness level V1 in "blue" and the risk level V2 in "red." However, the spare attentiveness level V1 and the risk level V2 may be shown in different colors. It is recommended that a color for the spare attentiveness level V1 and a color for the risk level V2 should be complementary colors to each other.

Further, the foregoing embodiment is described in which the driver drives a vehicle. However, it is possible to use the technology described above also when the driver drives means of transport or machines other than vehicles.

Further, in the foregoing embodiment, the server 1 determines a taste of the driver based on the variety of information relating to the driver during driving in the past. On the other hand, the server 1 may determine the taste of the driver by collecting information further from a communication terminal, such as a smartphone and a tablet PC that the driver uses daily.

Further, functions explained as one group in the foregoing embodiment do not have to be implemented by a single physical element but may be implemented by different physical elements. Moreover, functions explained as plural groups in the foregoing embodiment may be implemented by a single physical element. In addition, if one function is implemented, as a whole, through communications of information among apparatuses disposed in and outside the vehicle, a procedure relating to the function may be divided to be performed by those apparatuses.

All or a part of the functions described to be implemented by execution of a program by software in the foregoing embodiment may be implemented by an electrical hardware circuit. Moreover, a function explained as one group in the foregoing embodiment may be implemented by cooperation between software and hardware.

While the invention has been shown and described in detail, the foregoing description is in all aspects illustrative and not restrictive. It is therefore understood that numerous other modifications and variations can be devised without departing from the scope of the invention.

What is claimed is:

1. A display control apparatus that controls a display apparatus for providing information to a driver of a vehicle while the driver is driving the vehicle, the display control apparatus comprising a controller configured to:
    (i) derive a first parameter according to a state of the driver at a present moment, the first parameter representing a load that the driver can handle in addition to a present load exerted on the driver at the present moment;
    (ii) derive a second parameter according to a risk level of an accident at the present moment, wherein the second parameter is derived based on (a) a third parameter that is determined according to a risk level attributed to traveling of the vehicle, and (b) a fourth parameter that is determined according to a risk level attributed to the relationship between the vehicle and the object around the vehicle; and
    (iii) cause a reference graphic, determined according to the first parameter and the second parameter, to be continuously displayed on the display apparatus while the driver is driving the vehicle, wherein
    the risk level is derived based on traveling of the vehicle and a relationship between the vehicle and an object around the vehicle,
    the controller is further configured to obtain, over a network from a server, a location accident rate for a location of the vehicle,
    the location accident rate is a rate of accidents that have occurred on a road near the location of the vehicle, and
    the third parameter is based at least in part on the obtained location accident rate for the location of the vehicle.

2. The display control apparatus according to claim 1, wherein the reference graphic represents a relative relationship between the first parameter and the second parameter.

3. The display control apparatus according to claim 2, wherein the reference graphic represents the relative relationship between the first parameter and the second parameter with color.

4. The display control apparatus according to claim 2, wherein the reference graphic represents the relative relationship between the first parameter and the second parameter by a ratio of areas.

5. The display control apparatus according to claim 1, wherein the controller derives the first parameter based on a difference between a load acceptable capacity that represents the load that the driver can handle at the present moment and the present load exerted on the driver at the present moment.

6. The display control apparatus according to claim 5, wherein the reference graphic represents the load acceptable capacity along with a relative relationship between the first parameter and the second parameter.

7. The display control apparatus according to claim 6, wherein the reference graphic represents the load acceptable capacity by controlling a size of an outer edge of the reference graphic.

8. The display control apparatus according to claim 5, wherein the controller derives the present load based on a determination as to whether or not a content provided to the driver matches a taste of the driver.

9. A display system that provides information to a driver of a vehicle while the driver is driving the vehicle, the display system comprising:
    a controller configured to:
    (i) derive a first parameter according to a state of the driver at a present moment, the first parameter representing a load that the driver can handle in addition to a load exerted on the driver at the present moment; and (ii) derive a second parameter according to a risk level of an accident at the present moment, wherein the second parameter is derived based on (a) a third parameter that is determined according to a risk level attributed to traveling of the vehicle, and (b) a fourth parameter that is determined according to a risk level attributed to the relationship between the vehicle and the object around the vehicle; and a display that continuously displays a reference graphic, determined according to the first parameter and the second parameter, while the driver is driving the vehicle, wherein the risk level is derived based on traveling of the vehicle and a relationship between the vehicle and an object around the vehicle, the controller is further configured to obtain, over a network from a server, a location accident rate for a location of the vehicle, the location accident rate is a rate of accidents that have occurred on a road near the location of the vehicle, and the third parameter is based at least in part on the obtained location accident rate for the location of the vehicle.

10. An information providing method that provides information to a driver of a vehicle while the driver is driving the vehicle, the information providing method comprising the steps of:

(a) deriving a first parameter according to a state of the driver at a present moment, the first parameter representing a load that the driver can handle in addition to a load exerted on the driver at the present moment;

(b) deriving a second parameter according to a risk level of an accident at the present moment, wherein the second parameter is derived based on (a) a third parameter that is determined according to a risk level attributed to traveling of the vehicle, and (b) a fourth parameter that is determined according to a risk level attributed to the relationship between the vehicle and the object around the vehicle; and (c) causing a reference graphic, determined according to the first parameter and the second parameter, to be continuously displayed on a display apparatus while the driver is driving the vehicle, wherein the risk level is derived based on traveling of the vehicle and a relationship between the vehicle and an object around the vehicle, the controller is further configured to obtain, over a network from a server, a location accident rate for a location of the vehicle, the location accident rate is a rate of accidents that have occurred on a road near the location of the vehicle, and the third parameter is based at least in part on the obtained location accident rate for the location of the vehicle.

11. A non-transitory computer-readable recording medium that stores a program to be executed by a computer for providing information to a driver of a vehicle while the driver is driving the vehicle, the program, when executed by the computer, causing the computer to execute the steps of:

(a) deriving a first parameter according to a state of the driver at a present moment, the first parameter representing a load that the driver can handle in addition to a load exerted on the driver at the present moment;

(b) deriving a second parameter according to a risk level of an accident at the present moment, wherein the second parameter is derived based on (a) a third parameter that is determined according to a risk level attributed to traveling of the vehicle, and (b) a fourth parameter that is determined according to a risk level attributed to the relationship between the vehicle and the object around the vehicle; and (c) causing a reference graphic, determined according to the first parameter and the second parameter, to be continuously displayed on a display apparatus while the driver is driving the vehicle, wherein the risk level is derived based on traveling of the vehicle and a relationship between the vehicle and an object around the vehicle, the controller is further configured to obtain, over a network from a server, a location accident rate for a location of the vehicle, the location accident rate is a rate of accidents that have occurred on a road near the location of the vehicle, and the third parameter is based at least in part on the obtained location accident rate for the location of the vehicle.

12. The display control apparatus according to claim 1, wherein the second parameter is derived also based on:

(c) a fifth parameter that is determined according to a risk level attributed to inattentive driving of the driver.

13. The information providing method according to claim 10, wherein the second parameter is derived also based on:

(iii) a fifth parameter that is determined according to a risk level attributed to inattentive driving of the driver.

14. The display control apparatus according to claim 1, wherein the controller is further configured to:

obtain, over a network from a server, weather information for an area near a location of the vehicle, derive, based at least in part on the obtained weather information, a road surface friction coefficient, and determine, based at least in part on the derived road surface friction coefficient, the fourth parameter.

15. The information providing method according to claim 10, wherein the determination of the fourth parameter includes:

obtaining, over a network from a server, weather information for an area near a location of the vehicle, deriving, based at least in part on the obtained weather information, a road surface friction coefficient, and determining, based at least in part on the derived road surface friction coefficient, the fourth parameter.

16. The display control apparatus according to claim 1, wherein the controller is further configured to determine, based at least in part on a derived road surface friction coefficient, the fourth parameter.

17. The information providing method according to claim 10, wherein the determination of the fourth parameter includes determining, based at least in part on a derived road surface friction coefficient, the fourth parameter.

* * * * *